United States Patent
Zeng et al.

(10) Patent No.: US 10,571,596 B2
(45) Date of Patent: Feb. 25, 2020

(54) RESISTIVITY MEASUREMENT WHILE DRILLING DEVICE AND METHOD

(71) Applicants: CHINA PETROLEUM & CHEMICAL CORPORATION, Beijing (CN); SINOPEC Research Institute of Petroleum Engineering, Beijing (CN)

(72) Inventors: Yijin Zeng, Beijing (CN); Weining Ni, Beijing (CN); Xin Li, Beijing (CN); Wei Zhang, Beijing (CN); Jintai Mi, Beijing (CN); Jianhua Liu, Beijing (CN); Jibo Li, Beijing (CN); Jinping Wu, Beijing (CN); Meiling Zhan, Beijing (CN); Wenli Wang, Beijing (CN); Sanguo Li, Beijing (CN); Yiting Zheng, Beijing (CN)

(73) Assignees: CHINA PETROLEUM & CHEMICAL CORPORATION, Beijing (CN); SINOPEC RESEARCH INSTITUTE OF PETROLEUM ENGINEERING, Beijing (CN)

( * ) Notice: Subject to any disclaimer, the term of this patent is extended or adjusted under 35 U.S.C. 154(b) by 249 days.

(21) Appl. No.: 15/671,803

(22) Filed: Aug. 8, 2017

(65) Prior Publication Data
US 2018/0045847 A1 Feb. 15, 2018

(30) Foreign Application Priority Data
Aug. 9, 2016 (CN) .......................... 2016 1 0647498

(51) Int. Cl.
*G01V 3/00* (2006.01)
*E21B 47/00* (2012.01)
(Continued)

(52) U.S. Cl.
CPC .................. *G01V 3/38* (2013.01); *G01V 3/08* (2013.01); *G01V 3/28* (2013.01)

(58) Field of Classification Search
CPC ... G01V 3/00; G01V 3/02; G01V 3/08; G01V 3/10; G01V 3/18; G01V 3/20; G01V 3/26;
(Continued)

(56) References Cited

U.S. PATENT DOCUMENTS

| 5,339,037 A | 8/1994 | Bonner et al. | |
| 6,359,438 B1 * | 3/2002 | Bittar ....................... | G01V 3/28 324/369 |

(Continued)

FOREIGN PATENT DOCUMENTS

| RU | 2 413 841 C2 | 3/2011 |
| WO | 00/41006 A1 | 7/2000 |
| WO | 01/55748 A1 | 8/2001 |

*Primary Examiner* — Neel D Shah
(74) *Attorney, Agent, or Firm* — Buchanan Ingersoll & Rooney PC

(57) ABSTRACT

A resistivity measurement while drilling (MWD) device, including: a transmitting module arranged on an outer surface of a drill collar, for generating an induced current between the drill collar and surrounding formation by inductive coupling; a receiving electrode group including at least two electrodes, for receiving a measured current that reaches the electrode from the induced current through corresponding formation, two electrodes in the receiving electrode group being multiplexing electrodes; a resistivity calculation module configured to be connected to all or a part of the electrodes in the receiving electrode group in a measurement mode of the resistivity MWD device, to calculate the measured current received by a corresponding electrode and obtain resistivity of formation corresponding to the corresponding electrode; and a data transmission module configured to be connected to the multiplexing electrodes in a (Continued)

transmission mode of the resistivity MWD device, for transmitting calculated resistivity to a ground device.

14 Claims, 8 Drawing Sheets

(51) Int. Cl.
*G01V 3/38* (2006.01)
*G01V 3/28* (2006.01)
*G01V 3/08* (2006.01)

(58) Field of Classification Search
CPC .. G01V 3/28; G01V 3/38; E21B 47/00; E21B 47/12; E21B 47/16; E21B 47/122
See application file for complete search history.

(56) References Cited

U.S. PATENT DOCUMENTS

| | | | |
|---|---|---|---|
| 7,098,664 B2* | 8/2006 | Bittar | G01V 3/24 |
| | | | 324/357 |
| 2010/0116550 A1 | 5/2010 | Hutin et al. | |
| 2015/0035535 A1* | 2/2015 | Liu | G01V 3/28 |
| | | | 324/338 |
| 2015/0088426 A1* | 3/2015 | Tang | G01V 3/24 |
| | | | 702/7 |
| 2015/0212226 A1* | 7/2015 | Smith | G01V 3/28 |
| | | | 324/339 |
| 2018/0223655 A1* | 8/2018 | Wilson | E21B 47/122 |

\* cited by examiner

RESISTIVITY MEASUREMENT WHILE DRILLING DEVICE AND METHOD

FIELD OF THE INVENTION

The present disclosure relates to the field of oil and gas exploration and development technology, and in particular, to a resistivity measurement while drilling (MWD) device and method.

BACKGROUND OF THE INVENTION

With constant practice of oil and gas development, early conventional oil and gas reservoir development is now drawing to a close. Unconventional oil and gas reservoirs and complex oil and gas reservoirs, from shallow to deep ones, are now being developed. Geological-oriented construction is becoming increasingly common in these unconventional oil and gas reservoirs and complex oil and gas reservoirs. As modern electronic measurement technology continuously develops, an imaging measurement while drilling (MWD) apparatus can be used to measure engineering parameters such as well deviation and azimuth at a drill bit, and geometrical parameters such as resistivity, gamma, sound waves, and nuclear magnetism in a drilling procedure in real time, and realize imaging of the resistivity, gamma, sound waves, nuclear magnetism, etc.

Quite a large amount of imaging measurement data can be obtained in a drilling procedure. Taking MWD sound waves as an example, at least 250 Mbyte of data are required to enable complete storage of effective information. If other parameters are also measured, rather a huge amount of data will be necessary. However, a mud pulse performing real-time transmission has a transmission speed of smaller than 10 bit/s at the time of drilling. It is impossible for such a transmission speed to complete transmission of these data in the drilling procedure. Therefore, typically, these data are temporarily stored in an MWD apparatus until the drilling is completed and the MWD apparatus is pulled back to the ground, and then downloaded to a ground computer through cable transmission.

In order to complete the above task, it is necessary to specially provide a data download interface on a surface of the MWD apparatus, which is sealed at a high pressure and high temperature in a downhole through a cover. During data transmission, the cover is open to connect the MWD apparatus to a cable and a computer. Such a special design of the data download interface not only is inconvenient, but also increases costs.

On the other hand, two drilling modes are often used in directional drilling. In one of the two drilling modes, a ground power device does not drive a drill shaft to rotate, and only mud circulation drives the drill bit to drill by means of a screw. Such a drilling mode is also termed slide drilling, during which, a region of the MWD apparatus above the screw does not rotate. The other of the two drilling modes is compound drilling. In this operation mode, the ground power device drives the drill shaft to rotate, and also drives all drilling tools in downhole to rotate. Meanwhile, mud circulation drives the drill bit drill by means of the screw. In this case, the region of the MWD apparatus above the screw rotates. However, it is impossible to enable imaging in both of the above cases in the prior art.

SUMMARY OF THE INVENTION

In order to solve the above problem, the present disclosure provides a resistivity measurement while drilling (MWD) device, comprising:

at least one transmitting module arranged on an outer surface of a drill collar, for generating an induced current between the drill collar and surrounding formation by inductive coupling;

a receiving electrode group including at least two electrodes, for receiving a measured current of the induced current that reaches the electrodes through corresponding formation, wherein two electrodes in the receiving electrode group are designated as multiplexing electrodes;

a resistivity calculation module configured to be connected to all or a part of the electrodes in the receiving electrode group in a measurement mode of the resistivity MWD device, to calculate the measured current received by a corresponding electrode and obtain resistivity of formation corresponding to the corresponding electrode; and a data transmission module configured to be connected to the multiplexing electrodes in a transmission mode of the resistivity MWD device, for transmitting calculated resistivity to a ground device by means of the multiplexing electrodes.

Preferably, according to one embodiment according to the present disclosure, the resistivity MWD device further comprises a status indication module and a switch, wherein the status indication module is capable of issuing a status indication signal indicating whether the resistivity MWD device is in the measurement mode or the transmission mode; and wherein the switch is connected with the resistivity calculation module, the data transmission module, and the designated multiplexing electrodes in the receiving electrode group, for connecting, in accordance with the status indication signal, the designated multiplexing electrodes either to the resistivity calculation module, or to the data transmission module.

Preferably, according to one embodiment according to the present disclosure, the status indication module comprises a pressure detection unit, for detecting a pressure received on the drill collar, so as to enable the status indication module to:

send, when the pressure is greater than a preset threshold, a status indication signal indicating that the resistivity MWD device is in the measurement mode; or send, when the pressure is smaller than or equal to the preset threshold, a status indication signal indicating that the resistivity MWD device is in the transmission mode.

Preferably, according to one embodiment of the present disclosure, the receiving electrode group includes at least two subgroups mounted on the outer surface of the drill collar and spaced along an axial direction of the drill collar, a plurality of electrodes in each subgroup being circumferentially distributed and spaced apart from each other in a homogeneous manner in one same plane.

Preferably, according to one embodiment of the present disclosure, the receiving electrode group includes a plurality of electrodes mounted on the outer surface of the drill collar, the plurality of electrodes being circumferentially distributed and spaced apart from each other in a homogeneous manner in one same plane.

Preferably, in one embodiment according to the present disclosure, the electrodes in different subgroups are staggered.

Preferably, according to one embodiment of the present disclosure, the resistivity MWD device further comprises at least one receiving magnetic ring mounted on the outer surface of the drill collar, resistivity measured by the receiving magnetic ring being combined with resistivity measured by the electrode to obtain a radial detection depth dimension profile with respect to the formation.

Preferably, in one embodiment according to the present disclosure, when the drill collar is operating in a slide drilling mode, the resistivity calculation module is controlled to connect with each of all electrodes in the receiving electrode group, respectively.

Preferably, in one embodiment according to the present disclosure, when the drill collar is operating in a compound drilling mode, the resistivity calculation module is controlled to connect with one electrode of each subgroup.

Preferably, in one embodiment according to the present disclosure, the resistivity MWD device further comprises a tool face detection module, for providing a current tool face angle when a drilling tool is operating in the compound drilling mode, so as to determine a measurement sector in which the electrode is located.

Preferably, in one embodiment according to the present disclosure, the data transmission module includes a serial port transmission circuit, with two electrodes in the receiving electrode group being designated as serial data differential terminals.

Preferably, in one embodiment according to the present disclosure, the electrodes are mounted on respective centralizers of the drill collar.

Preferably, in one embodiment according to the present disclosure, the resistivity MWD device further comprises a magnetic connector, with its adsorption surface being attached to the designated electrode and connected to the ground device by means of a lead, so as to transmit, by means of the designated multiplexing electrode, measured resistivity to the ground device when the resistivity MWD device is operating in the transmission mode. The magnetic connector can be used together with an interface box to easily connect the receiving electrode to an external device, so as to transmit measurement data.

Preferably, in one embodiment according to the present disclosure, an analog signal multiplexer is connected between the resistivity calculation module and the receiving electrode group, the analog signal multiplexer having an output terminal connected to the resistivity calculation module, a plurality of input terminals connected to the electrodes in the receiving electrode group, and a control terminal receiving the status indication signal, so as to connect the output port to each of all the input ports successively, or to only one of the input terminals.

Preferably, in one embodiment according to the present disclosure, the resistivity calculation module further comprises:

a preamplifier, being connected between the plurality of input ports of the analog signal multiplexer and corresponding receiving electrodes; and a low-pass filter, being connected to the output port of the analog signal multiplexer, for performing low-pass filtering process on a measured current signal transmitted by the receiving electrode, so as to eliminate noise.

According to another aspect of the present disclosure, a resistivity MWD method is further provided, comprising the steps of:

receiving, by a transmitting magnetic ring, an alternating excitation current, so as to generate an induced current between a drill collar and surrounding formation by inductive coupling;

receiving, by a receiving electrode, a measured current through corresponding formation of the induced current;

receiving, by a switch, a status indication signal;

connecting, when the status indication signal indicates that a resistivity MWD device is operating in a measurement mode, a resistivity calculation module to all or a part of receiving electrodes in a receiving electrode group by means of the switch, so as to calculate the measured current received by the receiving electrode and obtain resistivity of formation corresponding to the receiving electrode; and connecting, when the status indication signal indicates that the resistivity MWD device is operating in a transmission mode, a data transmission module to a designated electrode in the receiving electrode group by means of the switch, so as to transmit calculated resistivity to a ground device through the designated electrode.

The resistivity MWD method according to the present disclosure further comprises the steps of:

detecting a pressure received on the drill collar, and comparing the pressure with a preset threshold, and sending the switch a status indication signal indicating that the resistivity MWD device is in the measurement mode when the pressure is greater than the preset threshold; or sending the switch a status indication signal indicating that the resistivity MWD device is in the transmission mode when the pressure is smaller than or equal to the preset threshold.

The resistivity MWD method according to the present disclosure further comprises the steps of:

controlling, when the drill collar is operating in a slide drilling mode, the resistivity calculation module to be connected to respective electrodes located at upper and lower portions of the drill collar; or controlling, when the drill collar is operating in a compound drilling mode, the resistivity calculation module to be connected to one electrode located in the upper portion of the drill collar and one electrode located in the lower portion of the drill collar, respectively.

According to the resistivity MWD device and method of the present disclosure, the receiving electrodes can be used not only for measurement of imaging measurement data, but also for downloading such data. Compared with the prior art, it is unnecessary for the present disclosure to use a special data downloading interface in the prior art. This optimizes a mechanical structure of a measurement short section of the drilling tool, and thus avoids a removing operation of a cover before data downloading, thereby improving working efficiency of a drilling platform.

In addition, the resistivity MWD device and method of the present disclosure can also adapt to resistivity measurement in different drilling modes. One device can be used to achieve functions of multiple devices in the prior art, thereby reducing costs for acquisition of resistivity MWD data. By means of lock-in amplification and filtration, a size of the electrode can be reduced to ½-⅓ of that of an electrode in the prior art, so that equivalent resolution can be doubled or even better.

Other features and advantages of the present disclosure will be further explained in the following description, and partly become self-evident therefrom, or be understood through implementation of the present disclosure. The objectives and advantages of the present disclosure will be achieved through the structures specifically pointed out in the description, claims, and the accompanying drawings.

BRIEF DESCRIPTION OF THE DRAWINGS

In order to explain the technical solution of the embodiments of the present disclosure or the technical solution in the prior art in a clearer manner, the accompanying drawings used in illustrating the prior art or the embodiments of the present disclosure are briefly introduced as follows, in which.

DETAILED DESCRIPTION OF THE EMBODIMENTS

The present disclosure will be explained in detail with reference to the embodiments and the accompanying drawings, whereby it can be fully understood how to solve the technical problem by the technical means according to the present disclosure and achieve the technical effects thereof, and thus the technical solution according to the present disclosure can be implemented. It is important to note that as long as there is no structural conflict, all the technical features mentioned in all the embodiments may be combined together in any manner, and the technical solutions obtained in this manner all fall within the scope of the present disclosure.

Meanwhile, various specific details are expounded in the following to provide a thorough understanding of the embodiments of the present disclosure. However, it is obvious for a person skilled in the art that, the present disclosure can be implemented through other specific details or in other specific manners than those described herein.

Figure 1:
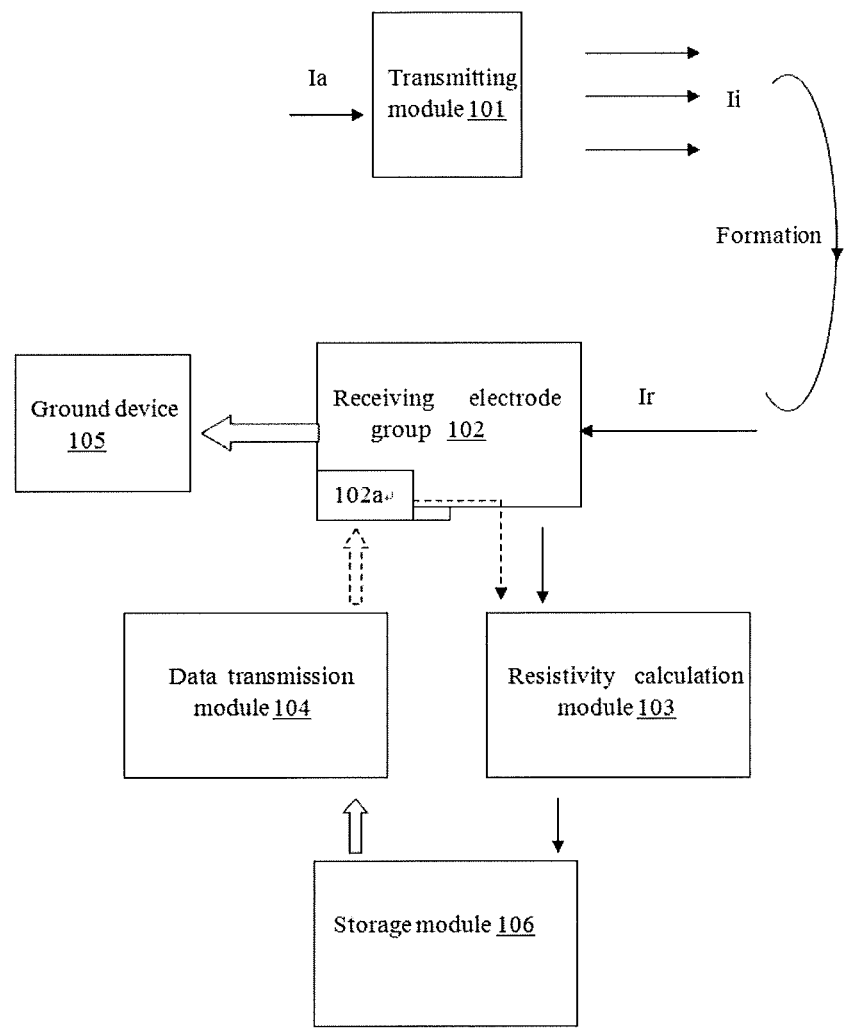
FIG. 1 schematically shows a resistivity measuring while drilling (MWD) device according to one embodiment of the present disclosure.

FIG. 1 schematically shows a resistivity measuring while drilling (MWD) device according to one embodiment of the present disclosure. In FIG. 1, it can be seen that the resistivity MWD device of the present disclosure includes a transmitting module 101, a receiving electrode group 102, a resistivity calculating module 103, and a data transmission module 104.

The transmitting module 101 is arranged on an outer surface of a drill collar, for generating an induced current Ii between the drill collar and surrounding formation by inductive coupling. In an embodiment, the transmitting module 101 is a winding magnetic ring mounted outside of the drill collar as a sleeve. An alternating excitation current of a specific frequency can be applied to both ends of the winding magnetic ring to generate an induced electromotive force on the drill collar, so as to generate the induced current Ii between the drill collar and the surrounding formation. A part of the induced current Ii flows into respective electrodes in the receiving electrode group 102 through the formation.

However, unlike the one as shown in FIG. 1, the transmitting module 101 of the present disclosure can be a plurality of, e.g., three, winding magnetic rings provided on upper and lower parts of the drill collar. In this case, one or two of the winding magnetic rings can be configured as receiving modules to receive radial resistivity of the formation as required. If the resistivity received by the receiving magnetic rings and resistivity received by receiving electrodes are combined in an imaging apparatus, a radial detection depth dimension profile of the formation can be obtained.

The receiving electrode group 102 as shown in FIG. 1 includes at least two electrodes. In FIG. 1, a receiving electrode receives a measured current Ir incoming through corresponding formation from the induced current. In order to use two electrodes in the receiving electrode group as terminals for transmitting data besides as a means for measuring resistivity, two of the electrodes are designated as multiplexing electrodes. Thus, the resistivity MWD device of the present disclosure has two operating modes, which are a measurement mode and a data transmission mode.

In the measurement mode of the resistivity MWD device, the resistivity calculation module 103 is connected to all or a part of the electrodes in the receiving electrode group. The resistivity calculation module 103, after receiving a current, will calculate the measured current received by a corresponding electrode, so as to obtain resistivity corresponding to the formation of the corresponding electrode.

As a resistivity MWD system follows a drill bit and a drill shaft down to the downhole during operation, it is unable to transmit all resistivity data to the ground in real time due to too large an amount of the data measured thereby. Thus, the resistivity data calculated during the operation of a drilling tool can be temporarily stored in a storage module 106 of the resistivity MWD device.

And in the transmission mode of the resistivity MWD device, the data transmission module 104 is configured to be connected to the multiplexing electrodes, for transmitting the calculated resistivity dada to a ground device 105 through the multiplexing electrodes. Since the resistivity data will be stored in the storage module 106 during continuous measurement, it is only necessary for the data transmission module 104 to access the storage module 106 to obtain the resistivity data, followed by data transmission to the ground device 105 with the multiplexing electrodes as the data transmission terminals.

The resistivity MWD device of the present disclosure further includes a status indication module and a changeover switch (not shown in FIG. 1) in order to indicate the operating mode thereof, i.e., the measurement mode or the data transmission mode.

The status indication module is capable of issuing a status indication signal to indicate whether the resistivity MWD device is in the measurement mode or the data transmission mode. The switch is connected with the resistivity calculation module 103, the data transmission module 104, and a multiplexing electrode 102a in the receiving electrode group 102, so as to connect the multiplexing electrode 102a to the resistivity calculation module 103 or to the data transmission module 104 according to the status indication signal.

For the sake of simplicity, a dotted thick arrow and a dotted thin arrow are used in FIG. 1 to indicate connection between the receiving electrode and the data transmission module, and connection between the receiving electrode and the resistivity calculation module under the control of the switch, respectively, while the switch is omitted. The switch can be a specific hardware switch (shown in FIG. 2a), or a soft switch achieved via program.

Figure 2A:
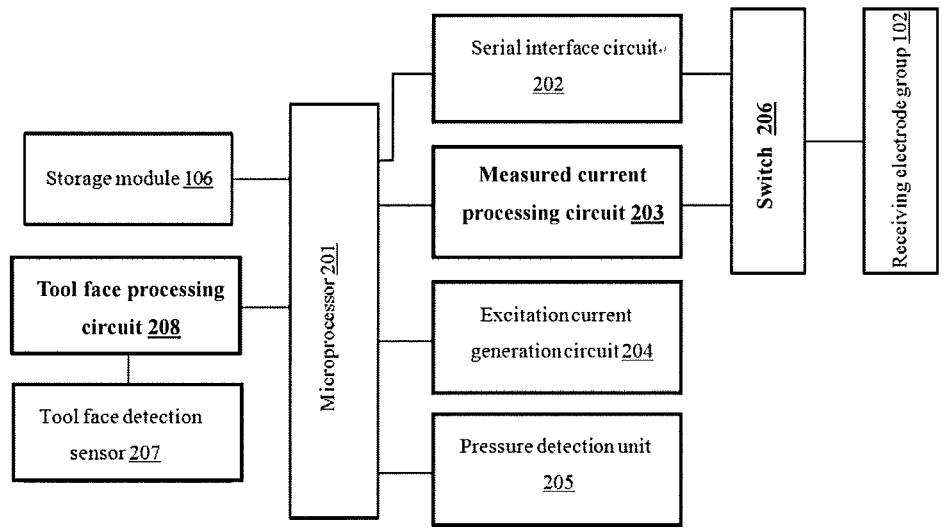
FIG. 2a is a structural diagram of the resistivity MWD device as shown in FIG. 1.

According to the present disclosure, the pressure received by a short section which the drill collar is located at is detected to judge whether the resistivity MWD device is performing MWD operations in the downhole or has reached the ground to perform data transmission. Thus, the resistivity MWD device further includes a pressure detection unit 205 as shown in FIG. 2a. The pressure detection unit 205 is used to detect the pressure received on the drill collar, so as to enable the status indication module to issue, when the pressure is greater than a preset threshold, a status indication signal indicating that the resistivity MWD device is in the measurement mode, and when the pressure is smaller than or equal to the preset threshold, a status indication signal indicating that the resistivity MWD device is in the transmission mode. In general, the preset threshold can be set to be atmospheric pressure, or to be a range close to the atmospheric pressure, so as to adapt to air pressure variation in different areas.

In the present embodiment, the pressure detection unit 205 preferably includes a pressure sensor and a pressure data processing circuit, wherein the pressure sensor is preferably provided on a surface of the drill collar, so as to more accurately measure a pressure received thereby, while the pressure data processing circuit is preferably disposed inside of the drill collar. Of course, in other embodiments of the present disclosure, the pressure sensor and the pressure data processing circuit can also be provided at other reasonable positions depending on actual requirements, and the present disclosure is not limited thereto.

The various functional modules as mentioned above can be integrated in a chip, or achieved by discrete logic components. However, either achievement mode can be used to arrive at the objective of the present disclosure.

The principle of the present disclosure will be described in further detail with reference to an integrated chip such as a microprocessor in the following.

Figure 2B:
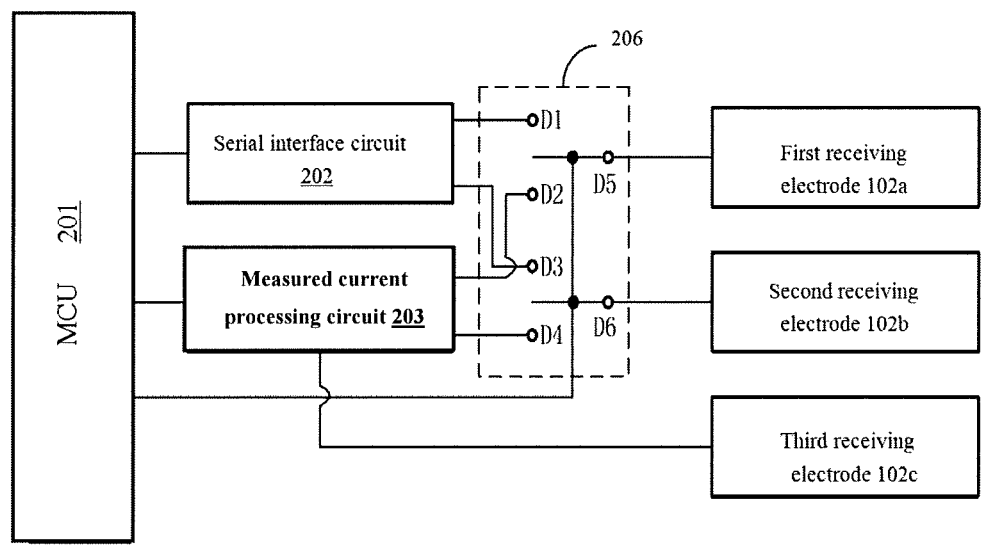
FIG. 2b is a diagram showing details of how a switch circuit in FIG. 2a connects a receiving electrode to a serial interface circuit and a measured current processing circuit.

FIGS. 2a and 2b respectively show structural diagrams of a system designed in accordance with the principle of the present disclosure. As shown in FIG. 2a, the resistivity MWD device provided in the present disclosure performs control and calculation operations substantially by means of a microprocessor 201. Specifically, the microprocessor 201 is used to realize the previously mentioned functions of resistivity calculation, data transmission control, status signal indication, etc. The microprocessor 201 is not limited to any type of micro-control units, digital signal processors, microcomputers, and the like products which are commercially available.

In FIG. 2a, the data transmission module 104 is essentially achieved by a serial interface circuit 202. A measured current processing circuit 203 is further connected between the microprocessor 201 and the receiving electrode, so as to amplify and de-noise the measured current as received and perform analog-to-digital conversion. This can facilitate the microprocessor 201 to perform digital process. A switch 206 is connected between the serial interface circuit 202 and the measured current processing circuit and the receiving electrode group 102. The switch 206 has a control terminal capable of adjusting its own turn-on state under the control of a status indication signal issued by the microprocessor, so as to complete electrical connection between the receiving electrode group 102 and the measured current processing circuit 203, or between the receiving electrode group 102 and the serial interface circuit 202 in different modes (measurement mode and data transmission mode) of the resistivity MWD device. Reference can be made to FIG. 2b for a detailed description of the switch 206.

In FIG. 2a, the storage module 106 is connected to the microprocessor 201, for temporarily storing resistivity measurement data obtained by the microprocessor 201 through calculation based on the current detected on the receiving electrode. When it is necessary to download the data in the resistivity MWD device, the multiplexing electrodes are controlled to connect to the serial interface 202 under control, so as to enable the microprocessor to read the resistivity measurement data from the data storage module 106 and transmit the data as read to the ground device through the serial circuit 202 by means of the multiplexing electrode 102.

The resistivity MWD device of the present disclosure further includes a tool face processing circuit 208 connected with the microprocessor 201. A tool face detection sensor 207 is connected to the tool face processing circuit 208, to obtain a current tool face angle of the drill bit. Thus, it can be determined whether the drilling tool is in a slide drilling mode or a compound drilling mode of operation, thereby providing reference for subsequent resistivity measurements.

FIG. 2b shows in detail use of the switch 206 in the present disclosure, with the receiving electrode group 102 including three receiving electrodes (102a, 102b, 102c) as an example.

In FIG. 2b, the receiving electrode group 102 includes three electrodes, i.e., a first receiving electrode 102a, a second receiving electrode 102b, and a third receiving electrode 102c, wherein the first receiving electrode 102a is connected to a fifth port D5 of the switch 206, and the second receiving electrode 102b is connected to a sixth port D6 of the switch 206. Two output ports of the serial interface circuit 202 are connected to a first port D1 and a third port D3 of the switch 206, respectively, and the two input ports of the measured current processing circuit 203 are connected to a second port D2 and a fourth port D4 of the switch 206, respectively. The fifth port D5 and the sixth port D6 of the switch 206 can be controlled to achieve connection of the first receiving electrode 102a and the second receiving electrode 102b respectively to the serial interface circuit 202, or to the measured current processing circuit 203, thereby realizing functional reuse of the two receiving electrodes. Therefore, these electrodes are also referred to as multiplexing electrodes in other places in the present disclosure.

In one embodiment, the resistivity MWD device employs a half-duplex mode during downloading of data. Therefore, it is only necessary to use two receiving electrodes as a DATA+ line and a DATA− line during the downloading of data. In other words, the first receiving electrode 102a and the second receiving electrode 102b in the present embodiment serve as two sets of data lines used in half-duplex serial port transmission.

In order to measure resistivity of deep, moderately deep, and shallow formation of a current sector of formation, the resistivity MWD device of the present embodiment further comprises the third receiving electrode 102c provided on the surface of drill collar at a different depth from the first receiving electrode and the second receiving electrode, respectively. As shown in FIG. 2b, the third receiving electrode 102c can be directly connected to the measured current processing circuit.

Figure 3A:
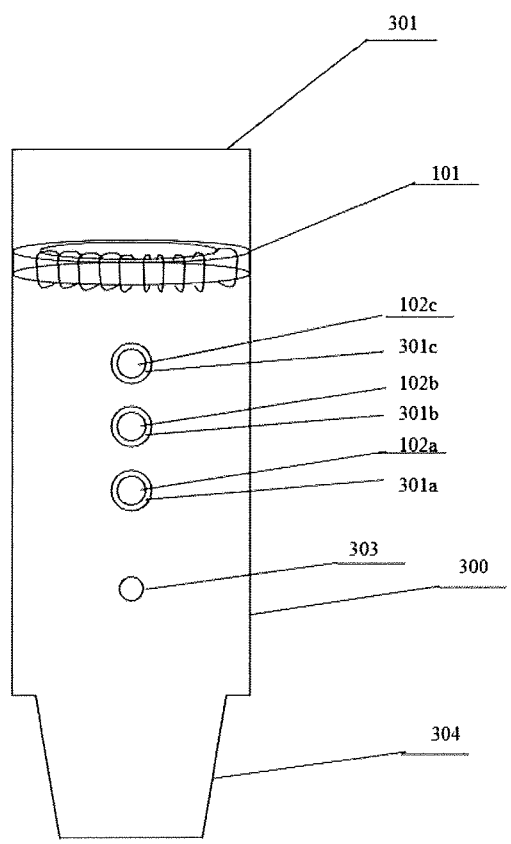
FIG. 3a is a structural diagram showing the resistivity MWD device mounted on a drill collar of a drilling tool according to one embodiment of the present disclosure.
Figure 3B:
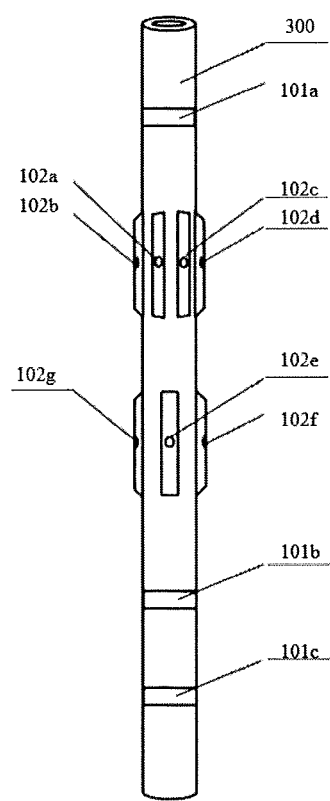
FIG. 3b is a structural diagram showing the resistivity MWD device mounted on a drill collar of a drilling tool according to another embodiment of the present disclosure.

FIGS. 3a and 3b show an arrangement diagram of the electrodes of the present disclosure on the drill collar.

In the embodiment shown in FIG. 3a, the receiving electrode group 102 includes three receiving electrodes 102a, 102b, 102c provided in a vertical direction of the drill collar at a shallow, moderately deep, and deep position, respectively.

An imaging MWD short section is required to have extremely high strength, so that too many mounting slots are generally unallowable on the drill collar. As a result, the spaces for mounting the receiving electrodes and the pressure sensor are very limited. In the present embodiment as shown in FIG. 3, the first receiving electrode 102a, the second receiving electrode 102b, and the third receiving electrode 102c can be mounted in circular grooves on the surface of the drill collar 300 through respective electrode insulating layers (i.e., a first electrode insulating layer 301a, a second electrode insulating layer 301b, and a third electrode insulating layer 301c). In the present embodiment, each of the above three receiving electrodes preferably comprises a metal cylinder with a thickness in the range from 1 to 3 cm, and is connected to a circuit board provided inside of the drill collar 300 through a high pressure pin.

In the present embodiment, the transmitting module 101 (shown as a transmitting magnetic ring herein) is preferably mounted in an annular groove provided on the surface of the drill collar 300, the annular groove being protected and insulated from the drill collar 300 by means of an insulating material. The transmitting magnetic ring 101 includes a plurality of turns of enameled wires wound around a toroidal core, and two ends of the enameled wires are connected to the circuit board inside of the drill collar 300 through high pressure pins, respectively. In the present embodiment, 100 turns of enameled wires are wound on the toroidal core of the transmitting magnetic ring 101. It is to be noted, however, that the number of turns of the enameled wires of the transmitting magnetic ring can be other reasonable values in other embodiments, and the present disclosure is not limited thereto.

As shown in FIG. 3a, the receiving electrode group 102 and the pressure sensor 303 are preferably provided on a same straight line along an axial direction of the drill collar. In this way, during a drilling procedure, while the drill collar 300 is rotating, a circuit system can detect a current tool face angle of the imaging MWD short section by means of the tool face detection sensor 207 and the tool face processing circuit 208, and detect currents in deep, moderate deep, and shallow formation of a present sector by cooperation between the transmitting the magnetic ring 101 and the first receiving electrode 102a, the second receiving electrode 102b, and the third receiving electrode 102c. The microprocessor 201 can then further perform resistivity calculation with respect to the currents. The microprocessor 201, after obtaining resistivity measurement data, will store such data in the storage module 106. The drill collar 300 can be connected to the drill bit, the drill shaft, and a mud pulse through a lower connecting hook 304 and an upper connecting hook 305, respectively.

The transmitting module 101 is a winding magnetic ring provided upstream of the drill collar. However, as shown in FIG. 3b, three winding magnetic rings can be provided also, one of which serves as a transmitting magnetic ring 101a for generating the induced current, and the other two are transmitting magnetic rings 101b and 101c serving as receiving magnetic rings. Resistivity received by the receiving magnetic rings and resistivity received by the receiving electrodes can be combined in an imaging apparatus, to obtain a radial detection depth dimension profile with respect to the formation, thereby providing more precise guidance to the drilling operation.

An electrode arrangement of FIG. 3a can be used in conjunction with circuit arrangements of FIGS. 2a and 2b to complete resistivity measurement in the compound drilling mode of the drilling tool. After the measurement, two of the electrodes are used for data transmission, thus avoiding shortcomings caused by a specialized data transmission port. However, the electrodes thus provided cannot detect the resistivity of the formation around the drill collar in the case of the drill collar not rotating, and thus cannot perform resistivity measurement during the slide drilling mode operation of the drilling tool. Hence, as shown in FIG. 3b, the receiving electrode group is arranged to include two subgroups, i.e., an upper subgroup and a lower subgroup, and a plurality of electrodes of each subgroup is arranged in one same plane and circumferentially spaced apart in a homogeneous manner.

In contrast to FIG. 3a, FIG. 3b further shows centralizers, which are mounted on an outer wall of the drill collar 300 in an axial direction thereof. The receiving electrodes 102a-102h each are correspondingly mounted on end faces of the centralizers. The receiving electrodes can also be designed to be "button" shape, and mounted on fin centralizers protruding from the outer wall of the drill collar 300. In such case, the receiving electrodes can be closer to the formation. This is more favorable for forming a current loop, thereby improving a signal-to-noise ratio of the measurement result.

As shown in FIG. 3b, the four receiving electrodes 102a-102d included in a first receiving electrode subgroup are preferably distributed on the surface of the drill collar in a homogeneous manner. That is, a circumferential angle of 90 degrees is formed between every two adjacent receiving electrodes. A second receiving electrode subgroup has a same structure as the first receiving electrode subgroup, but the electrodes in the different subgroups are staggered. In other words, a preset circumferential angle is formed between an upper electrode and a lower electrode. For example, the circumferential angle is preferably configured to be 45 degrees.

For example, with respect to the fifth receiving electrode 102e in the second receiving electrode subgroup, its extension line along the axial direction of the drill collar 300 will be located in a middle position between the first receiving electrode 102a and the third receiving electrode 102c of the first receiving electrode subgroup. That is, a circumferential angle of 45 degrees is formed both between the axial extension line and the first receiving electrode 102a and between the extension line and the third receiving electrode 102c. In this way, doubly homogeneous distribution of eight receiving electrodes is achieved within one circumference of the drill collar 300, which is equivalent to achievement of eight-sector imaging. Hence, such an arrangement allows an increase in the number of sectors that can be detected by the resistivity MWD device during the slide drilling procedure thereof, thereby improving detection accuracy of the system.

It is to be noted that, in other embodiments of the present disclosure, the above-described preset circumferential angle can be configured to be other reasonable values according to actual requirements, and the present disclosure is not limited thereto.

In the present embodiment, the resistivity MWD system can thus measure the resistivity of eight sectors directly through eight receiving electrodes at two depths when the entire drilling system is in the slide drilling mode. When the entire drilling system is in a rotation drilling mode, the resistivity MWD system can realize multi-sector measurements at two depths using one receiving electrode in each of the two receiving electrode subgroups, i.e., altogether two receiving electrodes. The number of the sectors to be measured can be determined based on the detection speed and accuracy of the tool surface sensor. For example, it is possible to realize high-precision resistivity detection of 32 sectors or more. Thus, the resistivity MWD device provided in the present embodiment also can achieve multi-mode formation resistivity measurement.

In addition, the resistivity MWD device can also superimpose and combine measurement signals generated by four receiving electrodes in each of the receiving electrode subgroups according to actual requirements, thereby obtaining two non-directional lateral resistivity signals.

In the present embodiment, the resistivity MWD system further includes the second transmitting magnetic ring 101b and the third transmitting magnetic ring 101c. The first transmitting magnetic ring 101a, the second transmitting magnetic ring 101b, and the third transmitting magnetic ring 101c are distributed on the drill collar 300 and spaced from each other at a specific distance. Each of the three magnetic rings can be used as a transmitter to couple energy to the drill collar, and the energy then flows into the formation through the surface of drill collar and a surface of the magnetic ring. They can also be used as receivers to receive and detect a current generated by other transmitter in a loop formed by the drill collar and the formation, thus measuring the resistivity of the formation using a "lateral" method.

For example, in the present embodiment, if the first transmitting magnetic ring 101a serves as a transmitter, then the second transmitting magnetic ring 101b and the third transmitting magnetic ring 101c serve as receivers. Thus, the second transmitting magnetic ring 101b and the third transmitting magnetic ring 101c can transmit received signals to the microprocessor 201 through a signal receiving circuit, and the microprocessor 201 can thus obtain two non-directional lateral resistivity data.

In the present embodiment, the microprocessor 201 can also combine the lateral resistivity data obtained by the receiving electrode group with the lateral resistivity data obtained by the second transmitting magnetic ring 101b and the third transmitting magnetic ring 101c, to obtain a more detailed radial detection depth dimension profile.

Figure 4:
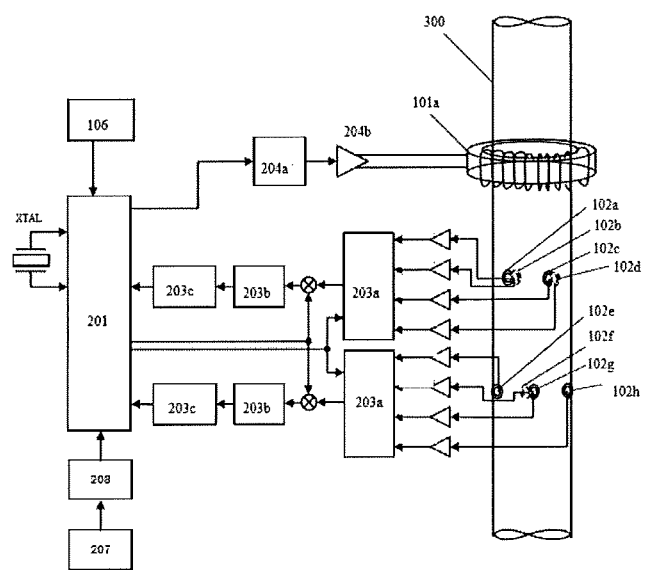
FIG. 4 shows a detailed circuit diagram of the resistivity MWD device according to one embodiment of the present disclosure.

It is necessary to add a multiplexer to the circuit to achieve the following, i.e., when the drill collar is operating in the slide drilling mode, the resistivity calculation module is controlled to be connected to all the electrodes in the receiving electrode group, respectively; while when the drill collar is operating in the compound drilling mode, the resistivity calculation module is controlled to be connected one electrode in each subgroup. Thus, as shown in FIG. 4, eight preamplifiers are provided and connected in one-to-one correspondence to the receiving electrodes 101. The eight preamplifiers are capable of amplifying the currents delivered by the eight receiving electrodes and transmitting them to eight input ports of two analog signal multiplexers 203a.

Each of the two analog signal multiplexers 203a further includes an output port and a control port, wherein the control port is connected to the microprocessor 201. The analog signal multiplexer 203a is able to turn on connection between its output port and one of the input ports under the control of the microprocessor 201. Thus, by the control of the microprocessor 201, the eight input ports of the two analog signal multiplexers 203 can be successively connected to respective output ports also. In this way, the microprocessor 201 can obtain the resistivity data corresponding to the currents detected by the respective receiving electrodes.

Since the eight receiving electrodes are distributed in one circumference of the drill collar at deviation angles of 45 degrees, the resistivity MWD system can complete, in the case where the drill collar does not rotate, collection of the resistivity data of the eight receiving electrodes, and then to achieve resistivity measurement of the eight sectors.

In the present embodiment, the resistivity MWD system further includes a tool face detection sensor 207 and a tool face signal processing circuit 208. The tool face signal processing circuit 208 is connected between the tool face detection sensor 207 and the microprocessor 201, and the microprocessor 201 is able to determine a current tool face angle of the imaging MWD short section based on a signal transmitted by the tool face signal processing circuit 208.

When the drill collar rotates, the analog signal multiplexer 203 connects its own output port with one of its input ports under the control of the microprocessor 201. For example, when the drill collar rotates to drill, the microprocessor 201 will control one of the analog signal multiplexers 203 to connect one receiving electrode (e.g., the first receiving electrode 102a) in the first receiving electrode subgroup to the microprocessor 201, and meanwhile control the other of the analog signal multiplexers 203 to connect one receiving electrode (e.g., the fifth receiving electrode 102e) in the second receiving electrode subgroup to the microprocessor 201. With the transmitting module 101 and the two receiving electrodes, the microprocessor 201 can detect the resistivity data in deep and shallow formation in a current sector. Since the drill collar is rotating, the microprocessor 201 can obtain the resistivity data in deep and shallow formation of different sectors in combination with tool face angles determined at different moments.

As can be seen from the above description, compared with an existing resistivity MWD system, the system provided in the present embodiment is capable of achieving resistivity measurements in a variety of combination operating modes. The system of the present embodiment sufficiently optimizes the structure of the resistivity MWD device and improves resolution of the resistivity data. At the same time, with a mixer and a filter, the system can effectively improve the signal-to-noise ratio during resistivity measurement, so that the current received by the receiving electrode can be smaller and the size of the receiving electrode can be reduced accordingly (e.g., to ½-⅓ of an original size). This will correspondingly increase equivalent resolution of the system.

Figure 5:
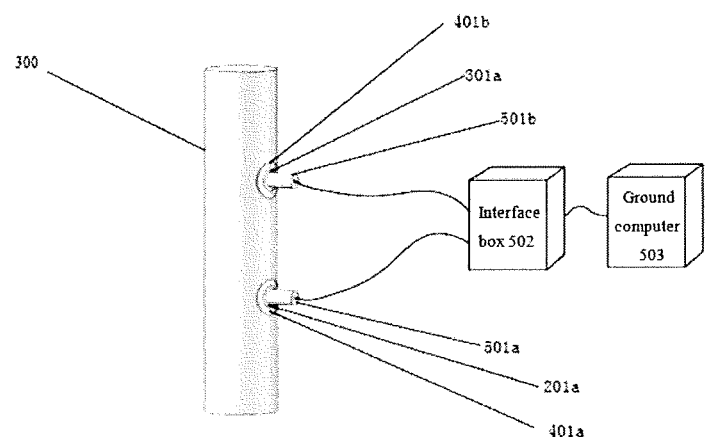
FIG. 5 schematically shows the resistivity MWD device according to the present disclosure being interconnected to a ground computer to read measurement data.

As shown in FIG. 5, an imaging MWD apparatus further includes magnetic connectors (501a, 501b) and an interface box 502. The interface box 502 is used for connection to a ground device (e.g., a ground computer 503), and the magnetic connectors (501a, 501b) are connected to the interface box 502 by means of a connecting cable. In the present embodiment, the magnetic connectors can be magnetically adsorbed on surfaces of corresponding receiving electrodes, so as to realize electrical connection between the interface box 502 and the multiplexing electrodes (102a, 102e), which facilitates transmission of the resistivity measurement data.

It is to be noted that in order to ensure reliability of the electrical connection between the magnetic connectors and the receiving electrodes, in the present embodiment, an adsorption area of the magnetic connector is preferably smaller than a surface area of its corresponding receiving electrode. That is, as shown in FIG. 5, a radius of the first magnetic connector 501a and that of the second magnetic connector 501b are respectively smaller than a radius of the first receiving electrode 102a and a radius of the fifth receiving electrode 102e.

Figure 6:
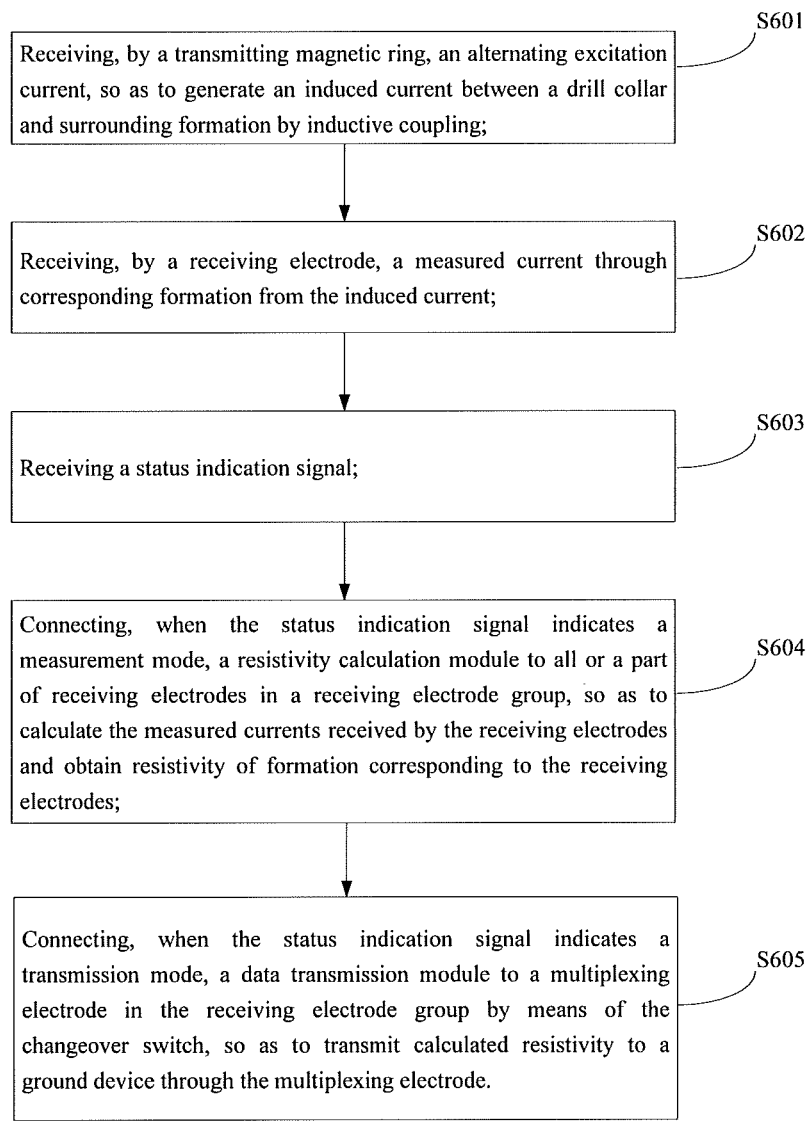
FIG. 6 shows a flow chart of a method for resistivity measurement and data transmission with the resistivity MWD device.

FIG. 6 shows a flow chart of a resistivity MWD method according to the present disclosure. The method begins with step S601, in which the alternating excitation current is received by the transmitting magnetic ring, to generate the induced current Ii between the drill collar and the surrounding formation by inductive coupling. Specifically, an excitation current signal is generated by the microprocessor 201. Next, in step S602, the measured current Ir is received by the receiving electrode through corresponding formation from the induced current.

In step S603, the status indication signal is received by the switch. In step S604, if the status indication signal indicates that the resistivity MWD device is operating in the measurement mode, the resistivity calculation module is connected to all or a part of the electrodes in the receiving electrode group by the switch, to calculate the measured current received by the electrode and obtain the resistivity of the formation corresponding to the receiving electrode. The resistivity calculation module is a functional module achieved in the microprocessor 201.

In step S605, when the status indication signal indicates that the resistivity MWD device is operating in the transmission mode, the data transmission module is connected to the designated electrode in the receiving electrode group by the switch, for transmitting the calculated resistivity to the ground device through the designated electrode. Some functions of the data transmission module herein are also achieved in the microprocessor 201.

Figure 7:
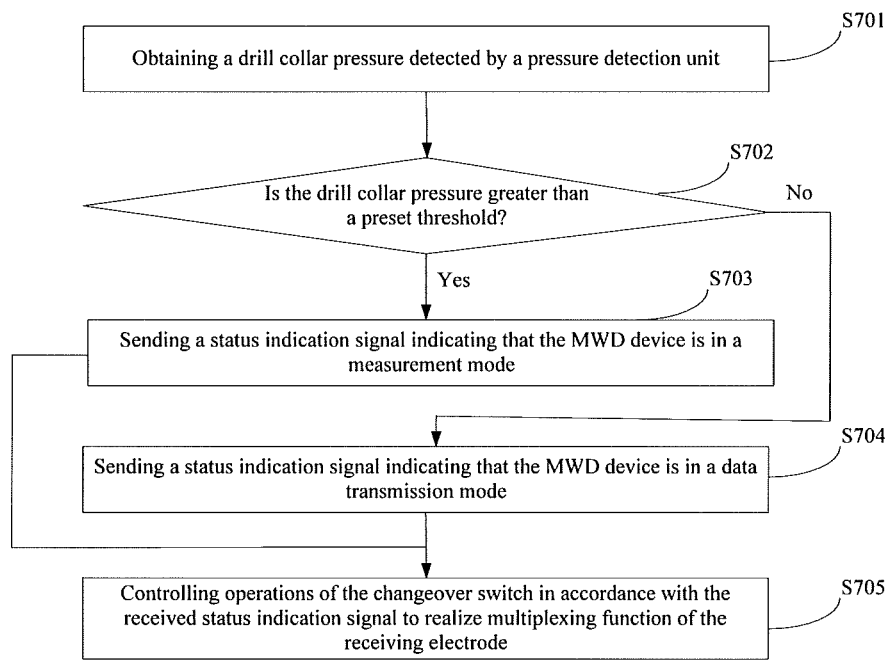
FIG. 7 shows a detailed flow chart of switching between a measurement mode and a data transmission mode.

FIG. 7 shows a flow chart of switch between the measurement mode and the data transmission mode.

As shown in FIG. 7, in step S701, the microprocessor detects the pressure received on the drill collar. Subsequently, in step S702, it is judged whether the pressure received on the drill collar is greater than the preset threshold.

In step S703, when the pressure is greater than the preset threshold, the microprocessor sends the switch a status indication signal indicating that the resistivity MWD device is in the measurement mode. In step S704, when the pressure is smaller than or equal to the preset threshold, the microprocessor sends the switch a status indication signal indicating that the resistivity MWD device is in the transmission mode. Finally, the switch is controlled according to the status indication signal sent by the microprocessor, so as to realize the multiplexing function of the receiving electrode.

Figure 8:
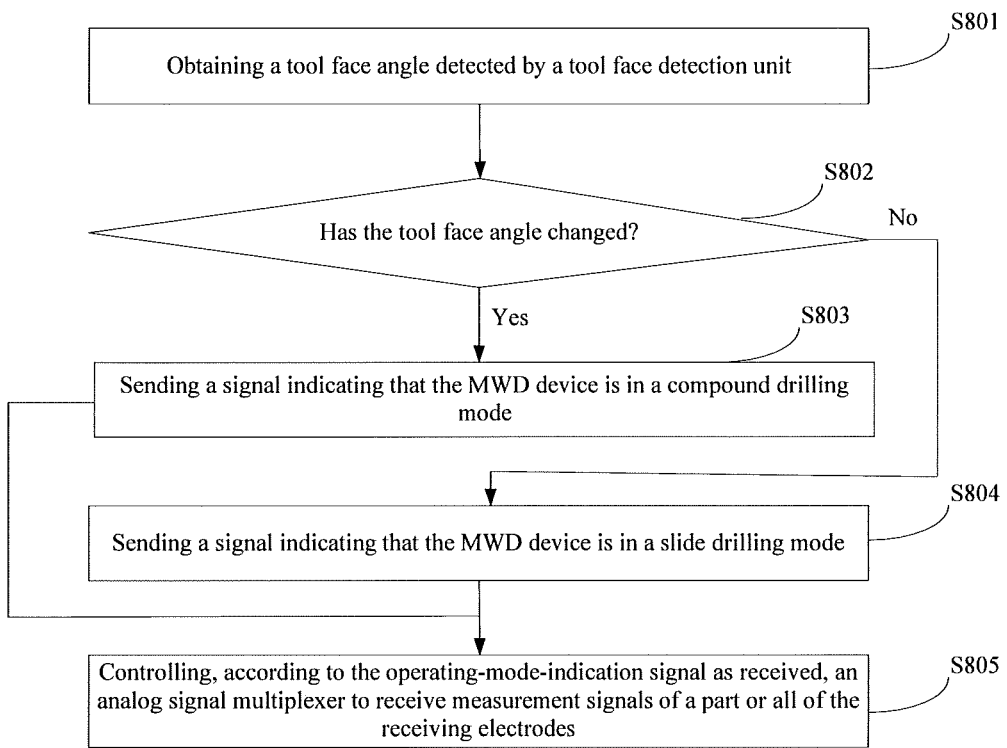
FIG. 8 shows a detailed flow chart of the resistivity MWD device of the present disclosure in different drilling modes.

FIG. 8 shows a detailed flow chart of the resistivity MWD device according to one embodiment of the present disclosure in different drilling modes. According to the present disclosure, when the drill collar is operating in the slide drilling mode, the resistivity calculation module can be connected to the electrodes at the upper and lower portions of the drill collar respectively under control; while when the drill collar is operating in the compound drilling mode, the resistivity calculation module can be connected to one electrode in each receiving electrode subgroup under control.

Specifically, in step S801, the tool face angle detected by the tool face detection unit is acquired. Then, in step S802, it is determined whether the tool surface angle has changed. If yes, it is judged in step S803 that the drilling tool is currently in the compound drilling mode, so that the microprocessor sends a signal indicating that the drilling tool is in the compound drilling mode. If no, it is judged in step S804 that the drilling tool is currently in the slide drilling mode, so that the microprocessor sends a signal indicating that the drilling tool is in the slide drilling mode.

Next, in step S805, an analog signal multiplexer receives measurement signals of a part or all of the receiving electrodes according to the operating-mode-indication signal as received.

Specifically, during an operation, the resistivity MWD device of the present disclosure follows the drill bit and the drill shaft down to the downhole. In this procedure, the microprocessor 201 uses a pressure detection circuit 108 to detect the pressure received on the entire short section. When the short section is above the ground, the pressure received on the entire short section will be smaller than or equal to the preset threshold; while when the short section is below the ground, the pressure received on the entire short section will be greater than the preset threshold.

When the pressure received by the entire short section is greater than the preset threshold, the microprocessor 201 will control the switch 206 to activate electrical connection of the measured current processing circuit 203 to the first receiving electrode 102a and the fifth receiving electrode 102e. At this moment, the system can measure the resistivity. In the present embodiment, according to actual requirements, a small portion of the data obtained by the microprocessor 201 can be uploaded to the ground through a corresponding mud pulse, and most of the measurement data are stored in a data storage circuit 106.

When a drilling procedure is completed, the imaging MWD short section follows the drill bit and the drill shaft to return to a drilling platform. At this moment, the pressure received on the entire short section will be close to zero, which is smaller than or equal to the preset threshold, so that the microprocessor 201 will activate the connection of the serial interface circuit 202 to the first receiving electrode 102a and the fifth receiving electrode 102e by means of the switch 206. Thus, an engineer can allow adsorption the two magnetic connectors separately to the first receiving electrode 102a and the fifth receiving electrode 102e. As a result, the ground computer can read imaging measurement data stored in the data storage circuit by means of the interface box, the magnetic connectors, the receiving electrodes, and a serial port transmission circuit, so as to download the imaging measurement data.

As can be seen from the above description, the resistivity MWD device provided in the present disclosure uses the receiving electrodes not only to measure the imaging measurement data, but also to download such data, thereby realizing reuse of the receiving electrodes. Compared with an existing imaging MWD apparatus, the device of the present disclosure can effectively avoid use of a specialized data downloading interface, thereby optimizing the mechanical structure of the measurement short section. At the same time, since the interface box can be easily connected to the receiving electrode by means of the magnetic connector, it is possible to avoid a removing operation of a protective cover before data downloading, as is the case with an existing device, thereby improving the working efficiency of a drilling platform.

In addition, the resistivity MWD device provided in the present disclosure is capable of achieving resistivity imaging during both slide drilling and compound drilling, and adaptively judging a current operating state by the tool surface sensor as built-in. The system of the present disclosure can effectively reduce the structural complexity of an imaging MWD system.

It should be understood that, the embodiments disclosed herein are not limited by the specific structures or steps disclosed herein, but incorporate the equivalent substitutes of these features which are comprehensible to those skilled in the art. It should be also understood that, the terms are used herein for describing the specific embodiments, not for limiting them.

The phrases "one embodiment" or "embodiments" referred to herein mean that the descriptions of specific features, structures, and characteristics in combination with the embodiments are included in at least one embodiment of the present disclosure. Therefore, the phrase "one embodiment" or "embodiments" that has appeared in different parts of the whole description do not necessarily refer to the same embodiment.

The embodiments are described hereinabove to interpret the principles of the present disclosure in one application or a plurality of applications. However, those skilled in the art, without departing from the principles and thoughts of the present disclosure, can make various modifications to the forms, usages, and details of the embodiments of the present disclosure without any creative work. Therefore, the scope of the present disclosure shall be determined by the claims.

The invention claimed is:

1. A resistivity measurement while drilling (MWD) device, comprising:
   a transmitting module arranged on an outer surface of a drill collar, for generating an induced current between the drill collar and surrounding formation by inductive coupling;
   a receiving electrode group including at least two electrodes, for receiving a measured current of the induced current that reaches the electrodes through corresponding formation, wherein two electrodes in the receiving electrode group are multiplexing electrodes;
   a resistivity calculation module configured to be connected to all or a part of the electrodes in the receiving electrode group in a measurement mode of the resistivity MWD device, to calculate the measured current received by a corresponding electrode and obtain resistivity of formation corresponding to the corresponding electrode;
   a data transmission module configured to be connected to the multiplexing electrodes in a transmission mode of the resistivity MWD device, for transmitting calculated resistivity to a ground device by means of the multiplexing electrodes;
   a status indication module; and
   a switch,
   wherein the status indication module is capable of issuing a status indication signal indicating whether the resistivity MWD device is in the measurement mode or the transmission mode; and
   wherein the switch is connected with the resistivity calculation module, the data transmission module, and the multiplexing electrodes in the receiving electrode group, for connecting, in accordance with the status indication signal, the multiplexing electrodes either to the resistivity calculation module, or to the data transmission module.

2. The resistivity MWD device according to claim 1, wherein the status indication module comprises a pressure detection unit for detecting a pressure received on the drill collar, so as to enable the status indication module to:
   send, when the pressure is greater than a preset threshold, a status indication signal indicating that the resistivity MWD device is in the measurement mode; or
   send, when the pressure is smaller than or equal to the preset threshold, a status indication signal indicating that the resistivity MWD device is in the transmission mode.

3. The resistivity MWD device according to claim 2, wherein the receiving electrode group includes at least two subgroups mounted on the outer surface of the drill collar and spaced along an axial direction of the drill collar, a plurality of electrodes in each subgroup being circumferentially distributed and spaced apart from each other in a homogeneous manner in one same plane.

4. The resistivity MWD device according to claim 2, wherein the receiving electrode group includes a plurality of electrodes mounted on the outer surface of the drill collar, the plurality of electrodes being circumferentially distributed and spaced apart from each other in a homogeneous manner in one same plane.

5. The resistivity MWD device according to claim 3, wherein the electrodes in different subgroups are staggered.

6. The resistivity MWD device according to claim 4, further comprising at least one receiving magnetic ring mounted on the outer surface of the drill collar, resistivity measured by the receiving magnetic ring being combined with resistivity measured by the electrode to obtain a radial detection depth dimension profile with respect to the formation.

7. The resistivity MWD device according to claim 1, wherein when the drill collar is operating in a slide drilling mode, the resistivity calculation module is controlled to connect with each of all electrodes in the receiving electrode group, respectively.

8. The resistivity MWD device according to claim 1, wherein when the drill collar is operating in a compound drilling mode, the resistivity calculation module is controlled to connect with one electrode of each subgroup.

9. The resistivity MWD device according to claim 8, further comprising a tool face detection module, for providing a current tool face angle when a drilling tool is operating in the compound drilling mode, so as to determine a measurement sector in which the electrode is located.

10. The resistivity MWD device according to claim 1, wherein the data transmission module includes a serial port transmission circuit, with two electrodes in the receiving electrode group being designated as serial data differential terminals.

11. The resistivity MWD device according to claim 1, wherein the electrodes are mounted on respective centralizers of the drill collar.

12. The resistivity MWD device according to claim 1, further comprising a magnetic connector, with its adsorption surface being attached to the designated electrode and connected to the ground device by means of a lead, so as to transmit, by means of the designated multiplexing electrode, measured resistivity to the ground device when the resistivity MWD device is operating in the transmission mode.

13. The resistivity MWD device according to claim 8, wherein an analog signal multiplexer is connected between the resistivity calculation module and the receiving electrode group, the analog signal multiplexer having an output port connected to the resistivity calculation module, a plurality of input ports connected to the electrodes in the receiving electrode group, and a control port receiving a signal indicating an operating mode of a drilling tool, so as to connect the output terminal to each of all the input terminals successively, or to only one of the input terminals.

14. The resistivity MWD device according to claim 13, wherein the resistivity calculation module further comprises:
- a preamplifier, being connected between the plurality of input ports of the analog signal multiplexer and corresponding receiving electrodes; and
- a low-pass filter, being connected to the output port of the analog signal multiplexer, for performing low-pass filtering process on a measured current signal transmitted by the receiving electrode, so as to eliminate noise.

* * * * *